US007653665B1

(12) United States Patent
Stefani et al.

(10) Patent No.: US 7,653,665 B1
(45) Date of Patent: Jan. 26, 2010

(54) SYSTEMS AND METHODS FOR AVOIDING DATABASE ANOMALIES WHEN MAINTAINING CONSTRAINTS AND INDEXES IN PRESENCE OF SNAPSHOT ISOLATION

(75) Inventors: Stefano Stefani, Seattle, WA (US); Wei Xiao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 10/940,891

(22) Filed: Sep. 13, 2004

(51) Int. Cl.
*G06F 12/00* (2006.01)

(52) U.S. Cl. .................. 707/203; 707/202; 709/203; 714/19

(58) Field of Classification Search ............ 707/203, 707/201, 3, 5, 202; 709/224, 203; 717/144; 714/19
See application file for complete search history.

(56) References Cited

U.S. PATENT DOCUMENTS

| 5,317,731 | A | * | 5/1994 | Dias et al. ................. 707/8 |
| 5,369,757 | A | * | 11/1994 | Spiro et al. ................. 714/19 |
| 5,381,524 | A | * | 1/1995 | Lewis et al. ............... 715/804 |
| 5,557,747 | A | * | 9/1996 | Rogers et al. ............. 709/223 |
| 5,576,979 | A | * | 11/1996 | Lewis et al. ................. 716/6 |
| 5,668,958 | A | | 9/1997 | Bendert et al. ............ 710/305 |
| 5,701,480 | A | * | 12/1997 | Raz ........................... 718/101 |
| 5,835,904 | A | | 11/1998 | Vicik et al. .................. 707/1 |
| 5,870,758 | A | * | 2/1999 | Bamford et al. ............ 707/201 |
| 5,956,731 | A | * | 9/1999 | Bamford et al. ............ 707/201 |
| 6,012,059 | A | * | 1/2000 | Neimat et al. ................ 707/8 |
| 6,192,377 | B1 | * | 2/2001 | Ganesh et al. ............. 707/203 |
| 6,363,387 | B1 | * | 3/2002 | Ponnekanti et al. ........ 707/10 |
| 6,453,325 | B1 | * | 9/2002 | Cabrera et al. ............. 707/204 |
| 6,529,921 | B1 | | 3/2003 | Berkowitz et al. ......... 715/500.1 |
| 6,543,006 | B1 | * | 4/2003 | Zundel et al. ............... 714/19 |
| 6,665,863 | B1 | | 12/2003 | Lord et al. .................. 717/144 |
| 6,728,719 | B1 | * | 4/2004 | Ganesh et al. .............. 707/100 |
| 6,735,593 | B1 | * | 5/2004 | Williams .................... 707/102 |
| 6,879,981 | B2 | * | 4/2005 | Rothschild et al. ........... 707/8 |
| 7,124,108 | B1 | * | 10/2006 | Kimle et al. ................. 705/37 |

(Continued)

OTHER PUBLICATIONS

Berenson, H. et al., "A Critique of ANSI SQL Isolation Levels," *Proc. ACM Sigmod '95*, San Jose, California, Jun. 1995, 1-10.

(Continued)

*Primary Examiner*—Joshua D Campbell
*Assistant Examiner*—Brandon Parker
(74) *Attorney, Agent, or Firm*—Woodcock Washburn LLP

(57) ABSTRACT

A system and method avoids anomalies in presence of data manipulation language (DML) plans maintaining dependent objects and snapshot isolation. An anomaly due to using a snapshot isolation level within the transaction is detected within a database transaction and the transaction is aborted based upon that detection. Involved in making the anomaly detection is determining whether a view of particular data accessed during the transaction under a snapshot isolation view to ensure read consistency differs from a view of the data under another isolation level, such as the read committed isolation level. Then a detection is made that an anomaly may occur if it is determined that the view of the data accessed during the transaction under the snapshot isolation differs from the view of the data under the other isolation level. Such anomaly avoidance prevents an indexed view being maintained nor a referential integrity constraint validated based on incorrect data.

10 Claims, 10 Drawing Sheets

U.S. PATENT DOCUMENTS

| | | | |
|---|---|---|---|
| 7,158,994 B1 * | 1/2007 | Smith et al. | 707/103 R |
| 7,167,550 B2 * | 1/2007 | Klos et al. | 379/201.01 |
| 7,174,331 B1 * | 2/2007 | Luo et al. | 707/8 |
| 7,206,805 B1 * | 4/2007 | McLaughlin, Jr. | 709/203 |
| 2002/0116457 A1 * | 8/2002 | Eshleman et al. | 709/203 |
| 2005/0027542 A1 * | 2/2005 | Bordawekar et al. | 705/1 |
| 2005/0138085 A1 * | 6/2005 | Verma et al. | 707/202 |
| 2005/0198621 A1 * | 9/2005 | Tillmann et al. | 717/128 |
| 2006/0277539 A1 * | 12/2006 | Amarasinghe et al. | 717/168 |
| 2007/0011322 A1 * | 1/2007 | Moiso | 709/225 |
| 2007/0043949 A1 * | 2/2007 | Bugbee | 713/176 |

OTHER PUBLICATIONS

Bhalla, S., "Executing Serializable Transactions Within a Hard Real-Time Database System," *Proceedings. Fifth International Conference on High Performance Computing*, Madras, India, Dec. 17-20, 1998, 408-415.

Boukerche, A. et al., "T3C: A Temporally Correct Concurrency Control Algorithm for Distributed Databases," *Proceedings 8th International Symposium on Modeling, Analysis and Simulation of Computer and Telecommunication Systems*, San Francisco, California, Aug. 29-Sep. 1, 2000. 155-163.

Shasha, D. et al., "Transaction Chopping: Algorithms and Performance Studies," *ACM Trans. on Database Systems*, 1995, 20(3), 325-363.

Yang, J.J. et al., "JPeniLite: An Extensible Transaction Server for the World Wide Web," *Hypertext 98: Ninth ACM Conference on Hypertext and Hypermedia*, Pittsburgh, Pennsylvania, Jun. 20-24, 1998, 256-266.

* cited by examiner

SYSTEMS AND METHODS FOR AVOIDING DATABASE ANOMALIES WHEN MAINTAINING CONSTRAINTS AND INDEXES IN PRESENCE OF SNAPSHOT ISOLATION

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

This invention relates to database management systems. More particularly, this invention relates to systems and methods for modifying data in a database while ensuring data integrity and consistency.

BACKGROUND OF THE INVENTION

A database management system (DBMS) is a collection of programs that enables one to store, modify, and extract information from a database. There are many different types of DBMSs, ranging from small systems that run locally on personal computers to large systems distributed across a network. DBMSs can differ widely. The terms relational, network, flat, and hierarchical all refer to the way a DBMS organizes information internally. The internal organization can affect how quickly and flexibly one can extract information. Requests for information from a database are made in the form of a query. Data modifications in DBMSs are made through data manipulation language (DML) statements. Such statements allow users to insert, update and delete rows from a table in a database, called the target table. The syntax of the insert statement allows defining the values for the columns of the rows to add to the table. The syntax of the delete statement allows for qualifying the rows to remove from the table. The syntax of update allows for both qualifying rows and specifying new values with which the columns will be modified.

The set of rules for constructing DML statements is known as a query language. Different DBMSs support different query languages, although there is a semi-standardized query language called structured query language (SQL). SQL is an ANSI (American National Standards Institute) standard computer language for accessing and manipulating database systems. SQL works with major database programs such as MICROSOFT ACCESS®, DB2®, INFORMIX®, MICROSOFT SQL SERVER®, ORACLE®, and SYBASE®, for example. There are many different versions of the SQL language, but to be in compliance with the ANSI standard, they must support the same major keywords in a similar manner (such as select, update, delete, insert, where, and others).

Transactions involving data manipulation language (DML) statements may experience some blocking and deadlocking due to reading data in presence of concurrent transactions performing data modifications. As a result, a newer type of isolation level called snapshot is designed to allow transactions to read possibly older but mutually consistent versions of data without blocking other transactions. In this way, snapshot isolation can preserve the consistency of query results while reducing the frequency of blocking and deadlocking. Snapshot isolation has, however, introduced new classes of anomalies that can occur when processing DML statements, that require accessing tables other than the target to validate referential integrity constraints or propagate changes to an indexed view (auxiliary scan), which need to be addressed using novel techniques.

In this regard, there is a need for systems and methods avoiding anomalies that occur due to ensuring read consistency with snapshot isolation in a way that will cause minimal service interruption, delay or impact on system performance.

SUMMARY OF THE INVENTION

In consideration of the above-identified shortcomings of the art, the invention provides systems and methods for detecting and avoiding anomalies in database transactions. It can be detected from a transaction that an anomaly may occur due to using a snapshot isolation level within the transaction. The transaction can be aborted based upon that detection. This may be performed in part by determining whether a view of particular data accessed during the transaction under the snapshot isolation view differs from a view of the data under another isolation level, such as the read committed (using locking) isolation level. (Note that references to read committed implies using locking). If such data does differ, the transaction may be aborted and rolled back. Otherwise, the transaction may be allowed to proceed. An indexed view will not be maintained, nor a referential integrity constraint validated, if it is detected from the transaction that an anomaly may occur.

An indication may be added to a set of rows resulting from an auxiliary table scan indicating whether each row differs from a view of the data under a snapshot isolation level. This added indication can be propagated in the in the query plan within the database transaction along with the set of rows resulting from the auxiliary table scan to a point before either an indexed view is maintained or a referential integrity constraint is validated. If the added indication indicates that at least one row remaining from the propagated set of rows resulting from the auxiliary table scan differs from a view of the data under a snapshot isolation level, then an anomaly may be determined to exist. Other advantages and features of the invention are described below.

BRIEF DESCRIPTION OF THE DRAWINGS

The systems and methods for avoiding anomalies in presence of DML plans maintaining dependent objects and snapshot isolation in accordance with the invention are further described with reference to the accompanying drawings in which:

FIG. 8a is a diagram illustrating an implementation of the query plans for the exemplary anomalous transactions of FIG. 6a following the alternative process of FIG. 5a;

FIG. 8b is a diagram illustrating an implementation of the query plans for the exemplary anomalous transactions of FIG. 6b following the alternative process of FIG. 5a; and FIG. 8c is a diagram illustrating an implementation of the query plans for the exemplary anomalous transactions of FIG. 6c following the alternative process of FIG. 5a.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview

Systems and methods are provided for avoiding the effect of anomalies that occur within database transactions due to ensuring read consistency with database systems operating using the snapshot isolation level. The primary way of accomplishing this is to efficiently identify and effectively stop transactions that would cause such anomalies to occur. The identification involves determining situations in which database transactions using a view of the data under snapshot isolation may not be consistent with more recent committed views of the data. In such situations, it is necessary to then verify whether the different views of the data do in fact conflict and then enter a transaction abortion process in which the user may try the transaction again. First, the transactions in which anomalies occur are described in conjunction with FIGS. 1a through 1c. Next, the example methods and processes for accomplishing anomaly detection and avoidance are described in detail in conjunction with FIGS. 2 through 5b. Then example implementations and examples of such processes are described in detail in conjunction with FIGS. 6a through 8c using the specific Timelines #2-4 of the sample transactions provided. Finally, FIGS. 9a and 9b provide a computing and networked environment which will be recognized as generally suitable for use in connection with the systems and methods set forth herein. Because the material in FIGS. 9a and 9b is generally for exemplary purposes, the corresponding description is reserved for the end of this specification, in the section entitled "exemplary computing and network environment."

Anomalous Transactions

Figure 1A:
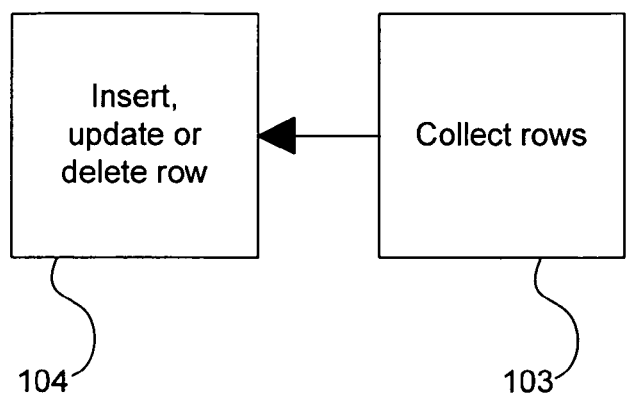
FIG. 1a is a block diagram illustrating the processing of DML statements.

Referring first to FIG. 1a, shown is a block diagram illustrating the processing of DML statements. Processing of DML statements, in MICROSOFT SQL SERVERS for example, is made of two phases. The first part 103 is read only, and responsible for determining which rows need to be inserted, updated or deleted, according to the type of statement. The second part 104 consumes the rows provided by the first, and performs the actual data modification.

Together with modifying the target table, the query processor of a DBMS has to ensure that data integrity is not compromised by the execution of the statement. This is achieved by a proper instrumentation of the DML query plan, with actions falling in two categories, either validating a constraint or maintaining a dependent data structure so that its content remains consistent with the target table. This allows subsequent data retrieval queries to receive the same results, independently from whether they read from the base table or a secondary structure. A DML statement can hence be seen as firing actions that were not explicitly described in the original syntax, but that are implicitly required in order to preserve data integrity. The most important and common implicit actions, described in further detail below, are:

Indexed view maintenance
Secondary index maintenance
Check and referential integrity constraint validation
Cascading actions
Full text notifications
Query notifications A view is a virtual table whose contents are defined by a query. Like a real table, a view consists of a set of named columns and rows of data. However, a view does not exist as a stored set of data values in a database. The rows and columns of data come from tables referenced in the query defining the view and are produced dynamically when the view is referenced. However, indexed views (often referred to in literature as materialized views) are views whose results are persisted in the database and indexed for fast access. As with any other view, indexed views and secondary indexes depend on base tables for their data. Such dependency means that if one changes a base table contributing to an indexed view, the indexed view or secondary index must be updated (i.e., maintained). This is called indexed view maintenance. Also, data is usually spread across several tables, which are related to each other through key columns. Database normalization is used to avoid duplicates in a database, thus avoiding potential errors. Although it's true that database normalization minimizes the chance for errors, it doesn't eliminate them, there is still the need for a set of data-integrity rules that will enforce the relationships between tables and keep the database as consistent as possible.

Figure 1B:
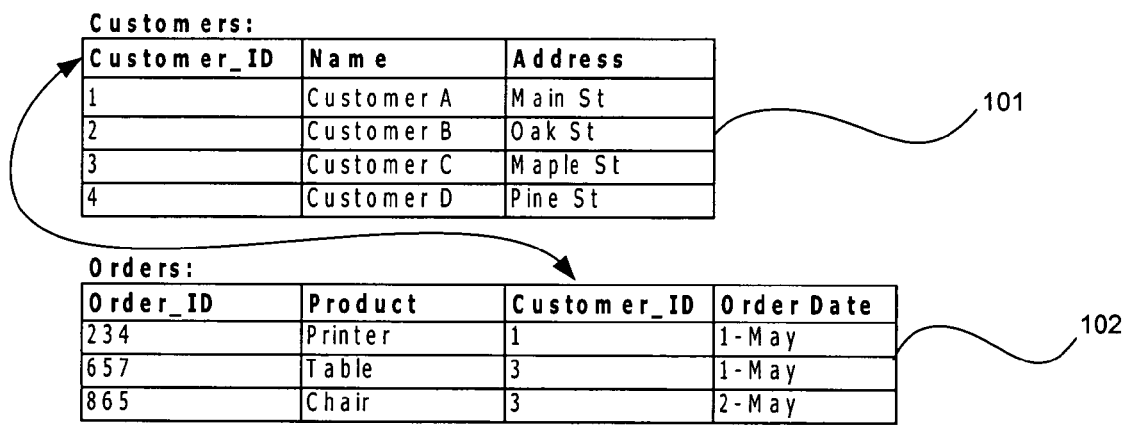
FIG. 1b illustrates two related tables of an exemplary sample database.

For example, referring to FIG. 1b, shown is a Customers table 101 and an Orders table 102. The Orders table 101 is related to the Customers table 102 through the Customer_ID key column. The Customer_ID provides the primary key for the Customers table 101 since there is a unique Customer_ID value for each record, or row, in the Customers table 101. In the Orders table 102, the Order_ID is the primary key and the Customer_ID in each row is referred to as a foreign key since it refers to the key of another table (the Customers table 101 in this case) and there may be the same Customer_ID for multiple different orders. Such is the case in the Orders table 102 where there are two orders (with Order_IDs 657 and 865) associated with Customer C (having Customer_ID of 3). There may exist a rule (i.e., constraint) that one could not delete a customer while there still exists an order for that customer in the Orders table 102. The set of these types of rules is called referential integrity, and it is a part of the wider set of rules that enforce data integrity in general. The implementation and enforcement of such rules is called referential integrity constraint validation.

Likewise, cascading actions are actions that must be performed on a secondary table to compensate when a primary table is modified. An example of the relationship between a primary and a secondary table is a one-to-many relationship between a primary table and a secondary table. This is shown the Customers table 101 and the Orders table 102, where each customer in the Customers table may have one or more orders in the Orders table. If a Customer_ID of a customer is changed, it must also be reflected in all the customer's orders in the Orders table 102.

Other implicit actions taken as a result a processing a DML statement are notifications. This occurs when the DBMS supports requests that a notification be generated if executing the same command again produces different results from those obtained initially. One accomplishes this by using a dependency object that detects when the underlying data is changed. For example, these notifications are sent to notify external code when the results of a query changes due to database updates.

Figure 1C:
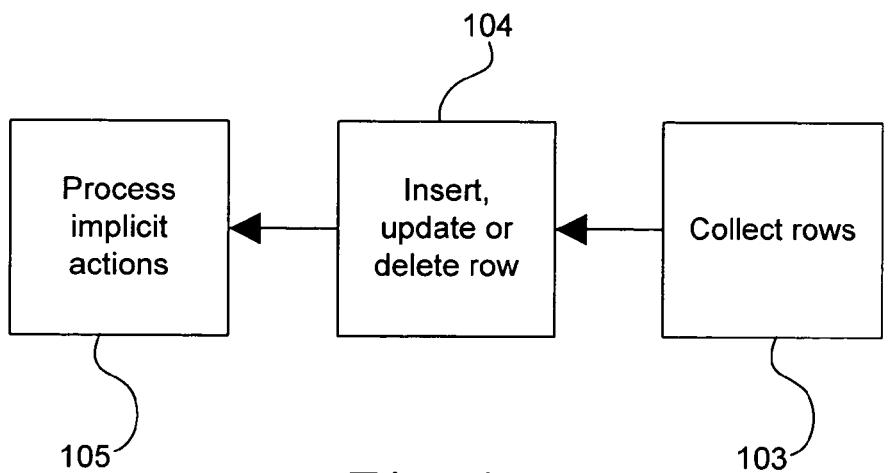
FIG. 1c is a block diagram illustrating the processing of DML statements involving implicit actions.

Referring next to FIG. 1c, shown is a block diagram illustrating the processing of DML statements involving implicit actions. Due to locking and concurrency issues, all of the implicit update actions described above are generally performed 105 after modifying the base table 104 as shown in FIG. 1a. Also, due to the implicit actions that may be taken when processing a DML plan, it is sometimes necessary to scan tables that were not explicitly referenced in the query statement, in order to preserve data integrity. Such auxiliary tables are introduced in DML query plans performing maintenance of indexed views whose definition contains either one or more tables or aggregates, in referential integrity constraint validation, and in cascading actions scenarios described above.

Auxiliary table scans are performed under the read committed isolation level, independently of the isolation level settings of the current transaction. The isolation level of read committed restricts DBMS transactions to reading only data that has been committed. This isolation level has the effect of blocking a transaction's read operation when the data is exclusively locked by another transaction. This prevents the DML plan from reading uncommitted data, as it would easily lead to data corruption. For example, this may occur when a transaction reads data that is being changed by another transaction that has not yet been committed or rolled back. Referring to the timeline below of a transaction on the database of FIG. 1, User 2 reads Customer A's address as Hickory St, when in fact, the User 1 transaction was changing Customer A's address and had not finished the transaction. User 1 would ultimately change Customer A's address back before committing. This caused User 2 to read, and possibly subsequently act on, incorrect data. This is commonly referred to as a "dirty read."

| Timeline #1 | | |
| --- | --- | --- |
| Step | User 1 | User 2 |
| 1 | Begin Transaction | |
| 2 | | Begin Transaction |
| 3 | Change customer A's address to Hickory St | |
| 4 | | Read Customer A's address |
| 5 | Change customer A's address back to Main St | |
| 6 | Commit | |

Performing the above transaction under a Read Committed isolation level would prevent this "dirty read" by not allowing User 2 to read Customer A's address until the User 1 transaction had been committed. Utilizing this isolation level, together with an appropriate sequencing of the index maintenance and constraint validation operations in DML query plans, has traditionally been a sufficient measure to avoid data corruption.

However, many DBMSs, such as MICROSOFT SQL SERVER®, for example, use a number of different isolation levels to govern the tradeoff between consistency of transactions and concurrency of multiple users. Historically, all transactions operated in the context of four isolation levels: read uncommitted, read committed, repeatable read, and serializable. These isolation levels affect the way that transactions take and hold shared locks on data resources. Shared locks are the locks taken when reading data; exclusive locks are the locks taken when changing data through an insert, update or delete statement. Exclusive locks are not compatible with other locks. If a first transaction updates a data row, no other transaction can update that row as long as that first transaction is still running and has not been committed or rolled back. With shared locks, a user may not read a row as long as that first transaction is still running and has not been committed or rolled back. However, without shared locks, a user may still read data that is currently being updated in another user's transaction. In this scenario, isolation levels may be used to prevent certain types of anomalies from occurring during a transaction due to these reads. As one raises a transaction's isolation level, however, one also increases the chances that a transaction's reads may block and deadlock with other transactions.

Even with the relatively low default read committed isolation level (described above), transactions may experience some blocking and deadlocking due to reading data. As a result, a newer type of isolation level called snapshot is designed to allow transactions to read older but consistent versions of data without being blocked by other transactions performing data modifications (as shared locks are always compatible with each other, and thus only updates can lead to blocking). In this way, snapshot isolation can preserve the consistency of the query result while reducing the frequency of blocking and deadlocking.

Snapshot isolation has, however, introduced new classes of anomalies, which need to be addressed using novel techniques. Since snapshot isolation allows a transaction to see a consistent view of the database as of its beginning, together with the transaction's own changes, it must create a virtual snapshot of the database at the beginning of the transaction, so to make concurrent changes made by other users invisible. The new anomalies caused by snapshot isolation are due to conflicting requirements when scanning the auxiliary tables in the DML query plan. In order to prevent corruption, it is necessary to access the currently committed data. Such data could however be different from what the current transaction would normally see under its snapshot if concurrent users have operated changes to the same table and committed them in the meanwhile.

For example, shown below is an anomaly that appears with having an indexed view to maintain. Assume a database has two tables T1 and T2, and an indexed view V defined as their join (a query that combines rows from two or more tables, views, or materialized views). Initially the tables, and consequently the view, are empty. Consider the following transaction timeline:

Timeline #2

| Step | User 1 | User 2 |
| --- | --- | --- |
| 1 | Begin Transaction | |
| 2 | | Begin Transaction |
| 3 | Insert row into T1 | |
| 4 | Commit Transaction | |
| 5 | | Insert row into T2 |
| 6 | | Select from V |
| 7 | | Select from T1 join T2 |
| 8 | | Commit Transaction |

At step 5, the second transaction has no choice but inserting a row inside the indexed view. The first transaction is already committed, and not maintaining the indexed view would cause data corruption. The following select performed at step 6 will return the row from the indexed view, since it has been inserted by the current transaction. However, the join query at step 7 will use a snapshot of T2 taken at the beginning of the transaction, when the table was still empty, and no row will be returned. Just like secondary indexes, indexed views are data structures introduced to speed up the execution of certain kinds of queries, and reading from them must produce the same results as if they did not exist, and the underlying base tables were accessed instead. This is, however, not the case here as the queries at steps 6 and 7 return different results.

Below is another example of an anomaly that occurs when using snapshot isolation. This time, the anomaly occurs when there is a referential integrity constraint to validate. Assume a database has two tables PK and FK, with FK referencing PK in a foreign key constraint. Initially the tables are empty. Let's consider the following timeline:

Timeline #3

| Step | User 1 | User 2 |
| --- | --- | --- |
| 1 | Begin Transaction | |
| 2 | | Begin Transaction |
| 3 | Insert row into PK | |
| 4 | Commit Transaction | |
| 5 | | Insert row into FK |
| 6 | | Select from PK join FK |
| 7 | | Commit Transaction |

The query plan for the insert performed at step 5 will contain a scan of the PK table, to verify that the values being inserted in FK references an existing row. If such a scan was performed under the read committed isolation level, then the insert would succeed. The following join performed at step 6, however, would return no rows, since PK would be read under the current snapshot, and appear empty. This would be an anomaly that could make applications not work properly, since it is never expected not to find in the referenced table a row matching a foreign key. If the scan of PK at step 5 was instead performed under the current snapshot, the insert would fail.

Scanning auxiliary tables under the current snapshot could however introduce data corruption in other scenarios, as illustrated in the next example. At the beginning of the following timeline, PK has a row and FK is empty.

Timeline #4

| Step | User 1 | User 2 |
| --- | --- | --- |
| 1 | Begin Transaction | |
| 2 | | Begin Transaction |
| 3 | | Insert row into FK |
| 4 | | Commit Transaction |
| 5 | Delete From PK | |
| 6 | Commit Transaction | |

The query plan at step 5 contains a scan of FK, to verify that no row exists in the foreign table matching the one being deleted. If the scan was performed under the current snapshot, the newly inserted row in FK would be missed, the delete would succeed, and data would be corrupted. Therefore, in order to avoid these anomalies that occur due to ensuring read consistency with snapshot isolation it is desirable to detect and avoid these situations within each transaction.

Anomaly Detection and Avoidance

Figure 2:
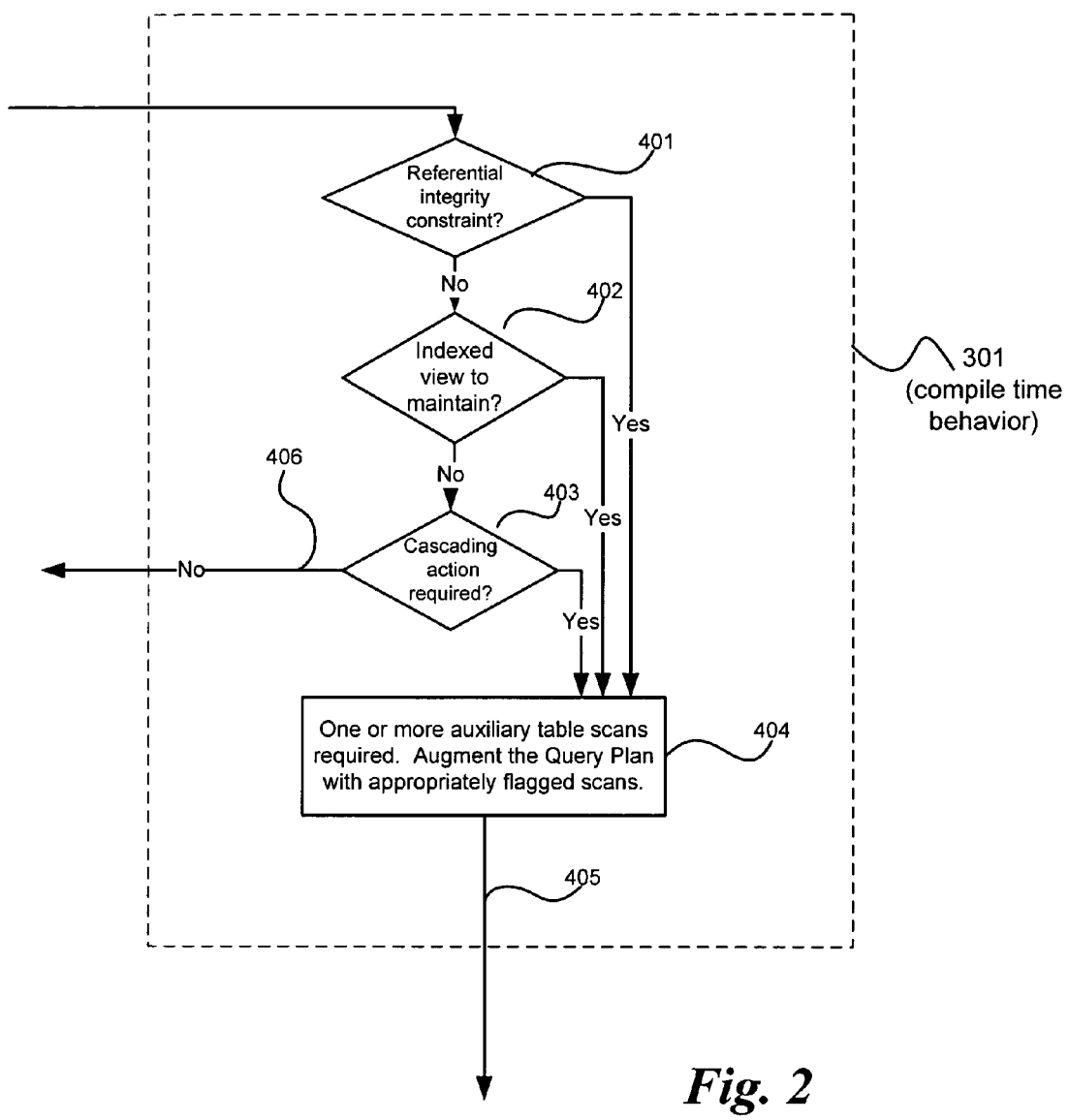
FIG. 2 is a flow chart illustrating a detailed view of a step in the processes of FIGS. 3, 4 and 5a that occurs at compile time when building the DML plan.
Figure 3:
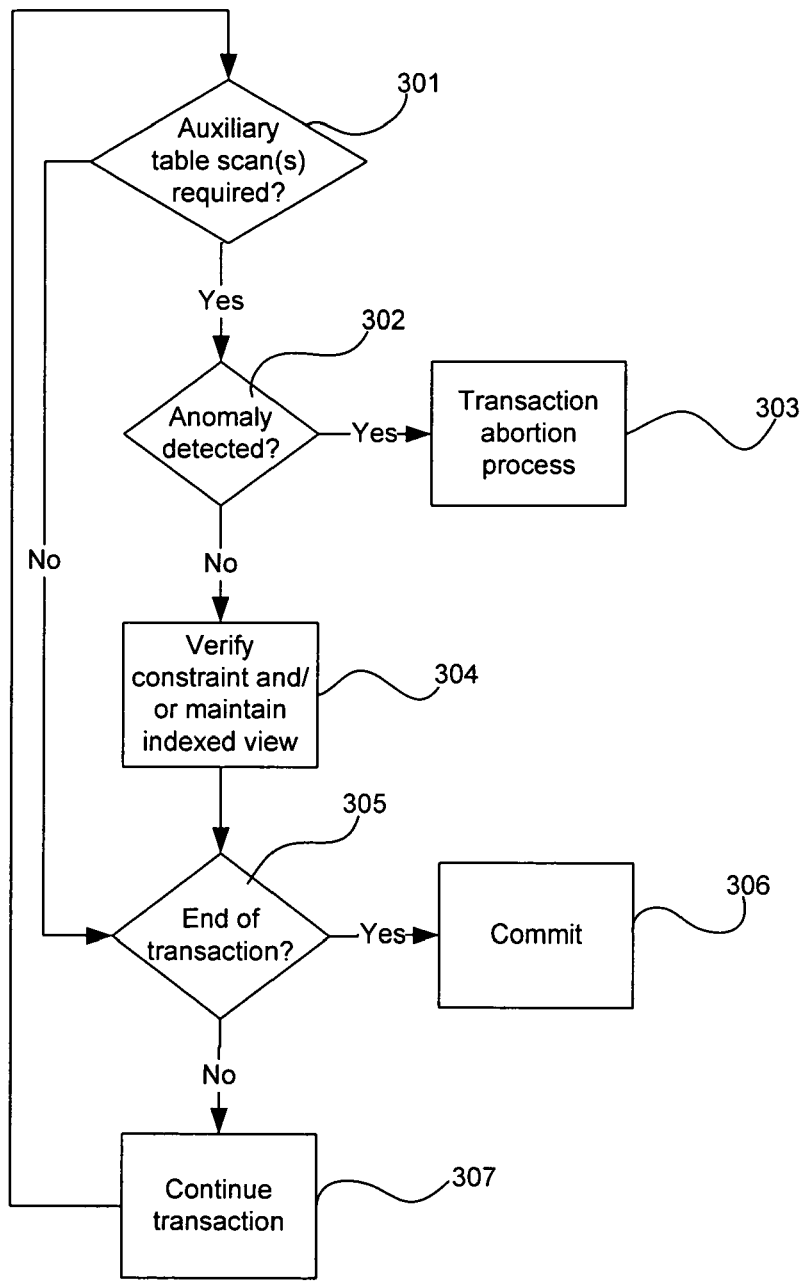
FIG. 3 is a flow chart illustrating a high level view of an exemplary process within a database transaction for avoiding anomalies.
Figure 4:
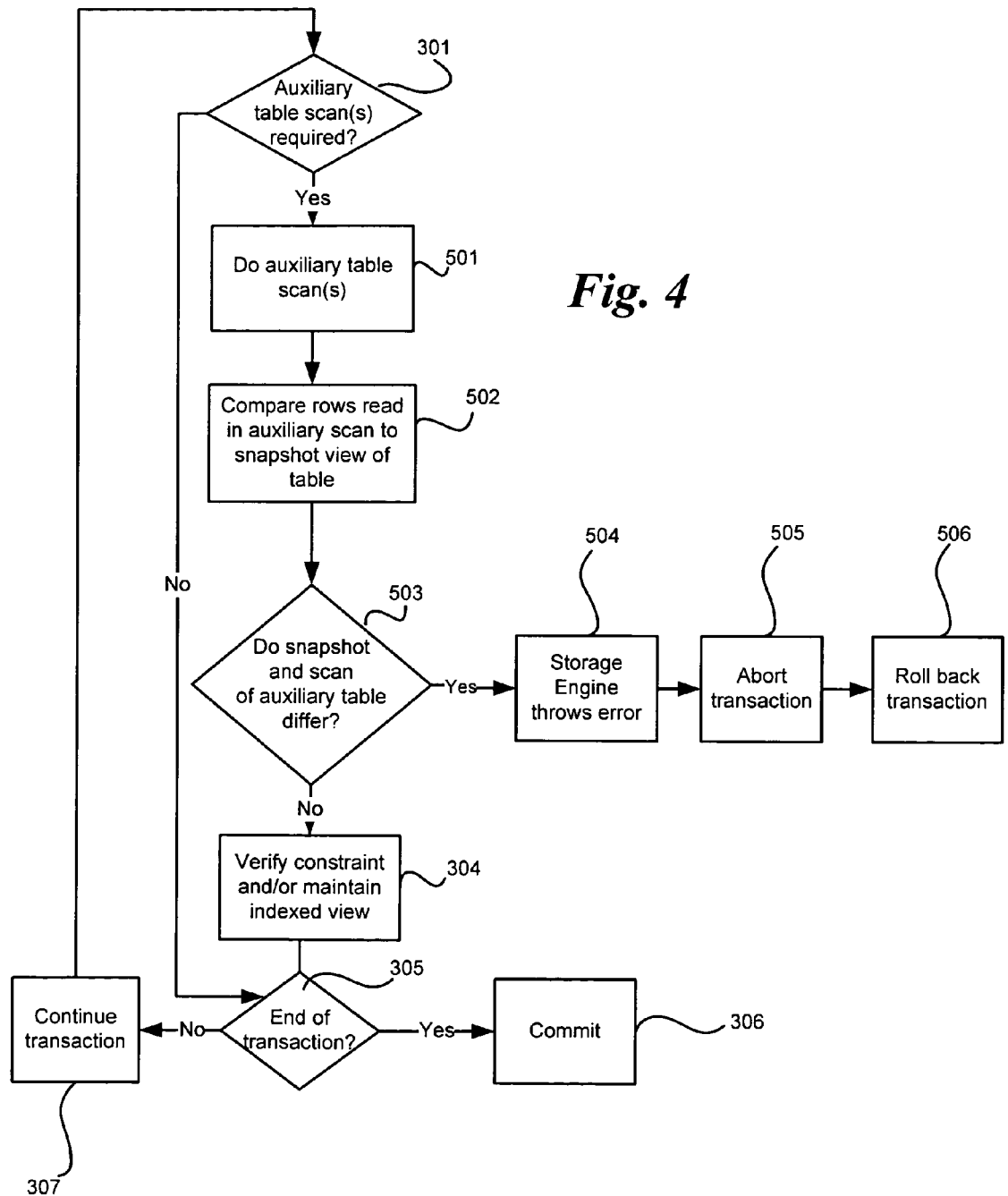
FIG. 4 is a flow chart illustrating a lower level view of the process of FIG. 3.
Figures 5A, 5B:
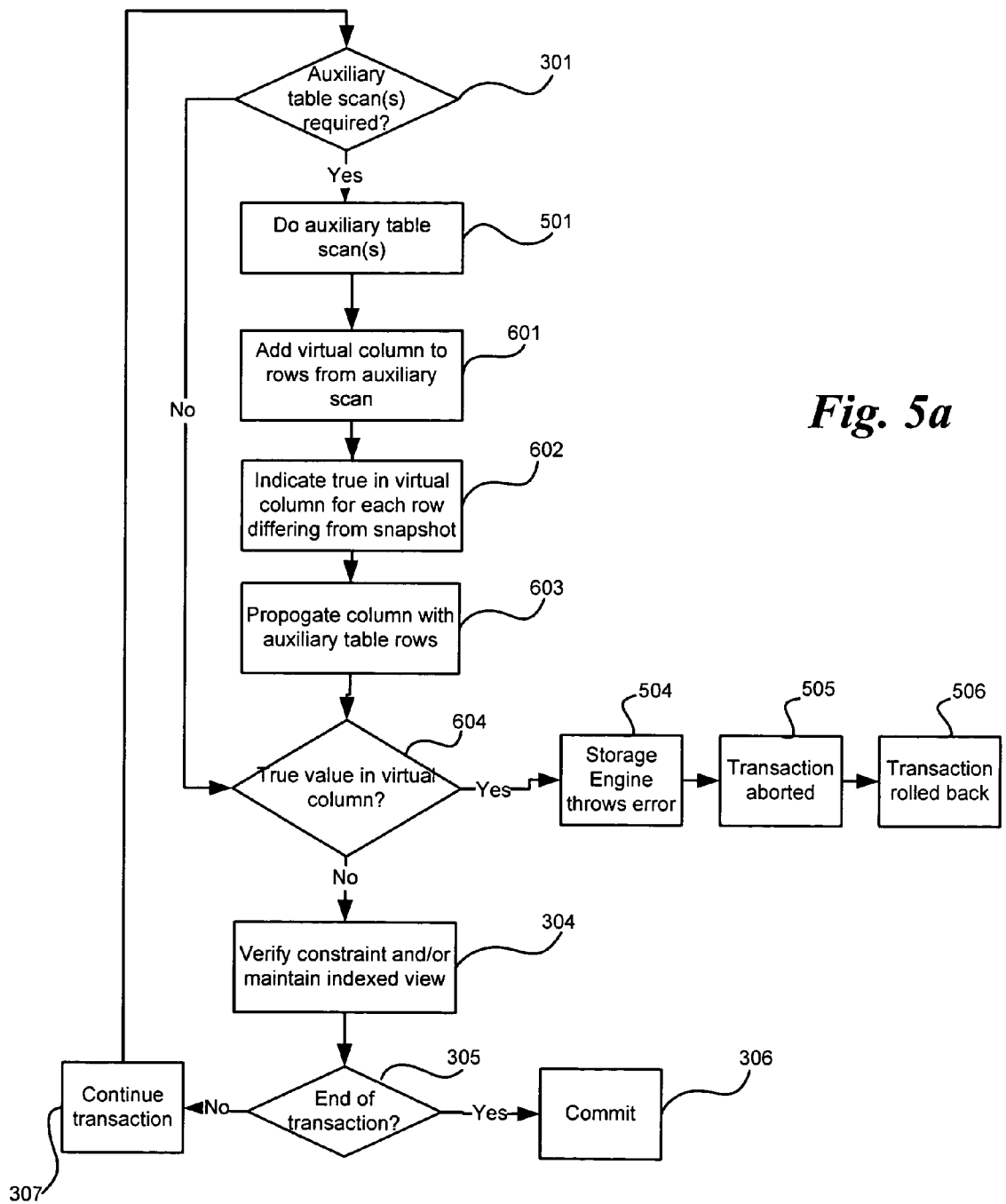
FIG. 5a is a flow chart illustrating an exemplary alternative process within a database transaction for avoiding anomalies.
FIG. 5b illustrates an exemplary set of rows returned after performing an auxiliary table scan corresponding to the sample database of FIG. 1b.

Referring next to FIG. 2, is a flow chart illustrating a detailed view of a step in the processes of FIGS. 3, 4 and 5*a* that occurs at compile time when building the DML plan. Illustrated is a detailed view of the act, occurring during compile time when building the DML plan, determining whether an auxiliary table scan is required 301 as a result of processing a DML statement. A single DML statement could be executing multiple different auxiliary scans on different tables, for the different kinds of objects that need to be maintained. For example, it could be necessary to scan a table to maintain a view, and to scan a different table to verify a foreign key constraint. Therefore, in the process of determining whether an auxiliary table scan is required 301, it is determined, as shown in FIG. 2, whether there is a referential integrity constraint 401, an indexed view to maintain 402, or a cascading action 403 required as a result of the current DML statement. If so, one or more auxiliary table scans will be required 404. The query plan is then augmented with appropriately flagged scans. This is accomplished by a flag being set for the auxiliary scan by a query processor of the corresponding DBMS such as MICROSOFT SQL SERVER® for example. However, it is to be understood that such an action, as well as other processes described herein may be implemented in hardware or software in any number of DBMSs such as MICROSOFT ACCESS®, DB2®, INFORMIX®, MICROSOFT SQL SERVER®, ORACLE®, and SYBASE®, for example, and their corresponding query languages. The query processor flag being set 404 for an auxiliary scan alerts the system (specifically the DBMS storage engine) that an anomaly may be present when performing the scan and that further processing is required 405 to detect it. Otherwise, the process can proceed 406 to the next DML statement, if any.

Referring next to FIG. 3, shown is a flow chart illustrating a high level view of an exemplary process within a database transaction for avoiding anomalies. Specifically, this process describes the actions taken in determining a query plan for processing a DML statement to avoid anomalies while the transaction is being performed under snapshot isolation. As described above, the new anomalies caused by snapshot isolation are due to conflicting requirements when scanning the auxiliary tables in the query plan. After a database transaction begins and during the processing of the DML statement, it is determined whether one or more auxiliary table scans are required 301. Whether one or more auxiliary table scans are required depends upon whether any implicit actions are required due to a number of factors having to do with preserving data integrity described in further detail with reference to FIG. 2 above. At compile time, i.e., when assembling the DML query plan, it is determined if one or more auxiliary table scans are required in order to implement implicit actions, such as updating an indexed view or performing a constraint validation. This is completed before any implicit actions, such as updating an indexed view or performing a constraint validation, are executed. At run time the query plan is executed. If there are no auxiliary table scans required, then the process skips to the step of determining whether the transaction has ended 305.

Once it is decided at compile time that one or more auxiliary table scans are required 301, it is determined at run time while executing the auxiliary scan whether an anomaly is detected 302 due to the use of the snapshot isolation level. If so, the transaction immediately enters the transaction abortion process 303 to avoid the anomaly. Otherwise, the implicit action required to maintain data integrity, such as updating an indexed view or performing a constraint validation, is executed 304. It is then determined whether the database transaction has ended 305. If so, the transaction is committed 306 such that the changes made are permanently reflected in the database and any locks are released. If there are still statements left to process in the transaction, then the transaction is continued 307 and the process starts over with determining whether one or more auxiliary table scans are required 301.

Referring next to FIG. 4, shown is a flow chart illustrating a lower level view of the process of FIG. 3. The anomaly detection step 302 of FIG. 3 is shown in greater detail as it is broken down further in FIG. 3. Additionally, the transaction abortion process 303 of FIG. 3 is also broken down and shown in greater detail. After it is determined that one or more auxiliary table scans are required 301, as described above, the corresponding auxiliary table scan or scans are performed 501. In performing the auxiliary table scan 501, the set of rows that are to be inserted, updated or deleted are read from the latest committed version of the corresponding auxiliary table and then compared 502 to those rows in the snapshot view of the table taken at the beginning of the transaction. This is performed by the storage engine of the DBMS and again it must be understood that this process may apply to and be implemented in any number of DBMSs such as MICROSOFT SQL SERVER®, MICROSOFT ACCESS®, DB2®, INFORMIX®, ORACLE®, and SYBASE®, for example. It is then determined whether the rows from the auxiliary table and the current transaction's snapshot view of the table differ 503. If they differ, then the transaction abortion process takes place. This comprises the storage engine generating an error 504 that is communicated to the user, the transaction itself being aborted 505, and the transaction then being rolled back 506 so as to remove any uncommitted changes. The user then has the opportunity to ret-try the transaction. By not allowing such anomalous transactions to complete, this process avoids the effects of such anomalies as described above associated with using the snapshot isolation level, while still ensuring data integrity and read consistency. However, if the compared rows from the auxiliary table and the current transaction's snapshot view of the table do not differ, then the process continues on to verify the constraint, maintain an indexed view, or both 304, as the case may be, as is described above with reference to FIG. 3.

In avoiding anomalies associated with using the snapshot isolation level, it is highly desirable to abort statements as infrequently as possible. That is, to abort the statement if and only if, an anomaly would otherwise be introduced, thus eliminating situations where statements are needlessly aborted, (i.e., avoiding false positives). If such were the case, it is expected that transaction abortions would be infrequent, as for them to occur it would be necessary that two concurrent transactions simultaneously perform DML operations over rows of different tables interacting with each other through a view or a constraint.

During query execution, the query processor of a DBMS generally has an overall knowledge of the entire DML query plan, while the storage engine of a DBMS generally has only the visibility of the scan being currently processed. This means that when performing an auxiliary scan, the storage engine will not know whether the rows being accessed will be terminally used to validate a constraint or maintain an indexed view, or still need to be processed through further joins or filters. As a result of that, false positives could be reported by the DBMS storage engine. This is due to the fact that when accessing a row as part of an auxiliary scan, the storage engine will not have the ability to tell whether it actually interacts with the rows that have been modified by the current statement in the primary target table. For example, referring to Timeline #3 in the above background section, an error should be raised if and only if the primary key corresponding to the row being inserted in the FK table has been changed by another user after the current transaction started. Changes to other rows in the PK table would not interfere with the current transaction, and should not cause errors to be generated.

Minimizing false positives can be achieved with a different, and slightly more complex, alternative approach. Since it is generally not possible for the DBMS storage engine to know immediately whether a row being read from an auxiliary scan is such to cause an anomaly, it is instead necessary to wait for the row to be processed through the various operators in the query plan. Then an error is raised only if the row actually makes it to the very end, that is, to the operator responsible either for the indexed view maintenance or constraint validation. Since auxiliary scans are performed under the read committed isolation level, if the row happens to be lost because of a filter or a join, it is guaranteed that it will not cause any anomaly for the current plan.

Referring next to FIG. 5a, shown is a flow chart illustrating an exemplary alternative process within a database transaction for avoiding anomalies. First, as with the previous approach, it is determined whether one or more auxiliary table scans are required 301. If so, then the corresponding auxiliary table scan (or scans) are performed 501. Then according to the alternate approach, the DBMS storage engine adds a virtual column to the rows being returned from the auxiliary table scans 601. This virtual column contains a Boolean value indicating whether the view of the row under snapshot isolation was different from the read committed isolation level 602.

For example, referring next to FIG. 5*b*, shown is an exemplary set of rows returned after performing an auxiliary table scan corresponding to the sample database of FIG. 1. In this example, if a current DML statement being processed was to either insert, update or delete rows 1 and 2 from the Customers table of FIG. 1, then these rows would be returned as is shown in FIG. 5*b*. Also notice that the virtual column has also been added to the returned set of rows. If the snapshot isolation view of a row (that view saved at the beginning of the current transaction) differs from that under the read committed isolation level (that view as of the last committed transaction) this would be indicated in the virtual column as a 1, for example. Otherwise, if these views of the rows did not differ, it would be indicated by a 0 in the virtual column. For exemplary purposes, the 1 indicated in the virtual column for row 1 would indicate that the snapshot isolation view of this row differed from that view of the row under the read committed isolation level. The 0 indicated in the virtual column for row 2 would indicate that the snapshot isolation view of this row was the same as the view of the row under the read committed isolation level.

Referring back to FIG. 5*a*, the virtual column then gets propagated together with the auxiliary table rows in the query plan through any filters and joins 603. The rows are then validated 604 before completing any required maintenance of indexed views or verifying any constraint. This is done by checking the virtual column and determining whether the snapshot isolation view of any of the propagated auxiliary table rows differed from that view of the row under the read committed isolation level. In the event that the any of the views of the propagated auxiliary rows do differ, then the transaction abortion process is entered with the DBMS storage engine or the query processor generating an error 504. The transaction is then aborted 505 and rolled back 506. If any of the rows returned from the initial auxiliary table scans are lost because of a filter or join, then it is not necessary to abort the transaction, whether the views of the row differed under snapshot isolation or not. The process described above will prevent this because only the rows propagated through the various operators in the query plan will be subject to validation. In case of aggregates in the query plan, their output will still contain the virtual column, and its value will be true if and only if true for at least one of the rows in input.

In event that the snapshot isolation view of the propagated auxiliary table rows do not differ from that view of the rows under the read committed isolation level, then the requisite constraints are verified and indexed views are maintained 304. The process then continues on to commit the transaction or continue, as the case may be, as is described above with reference to FIG. 3.

Examples and Sample Implementations

Figure 6A:
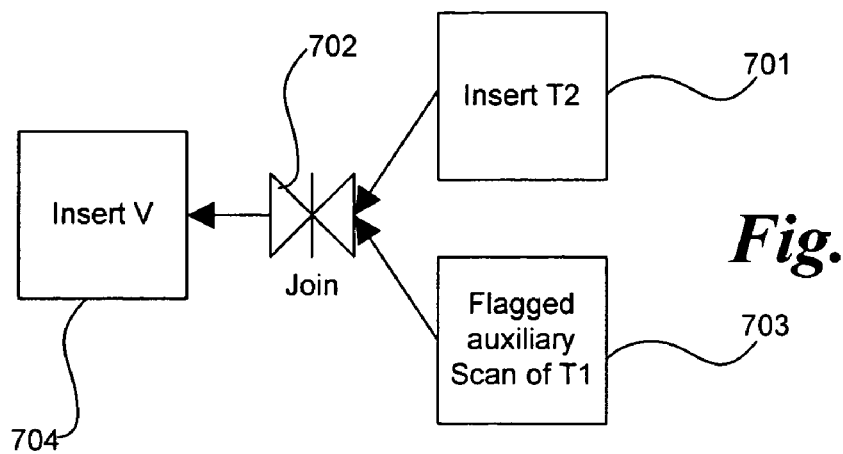
FIG. 6a is a diagram illustrating an implementation of query plan for an exemplary anomalous transaction from Timeline #2 of the specification.
Figure 6B:
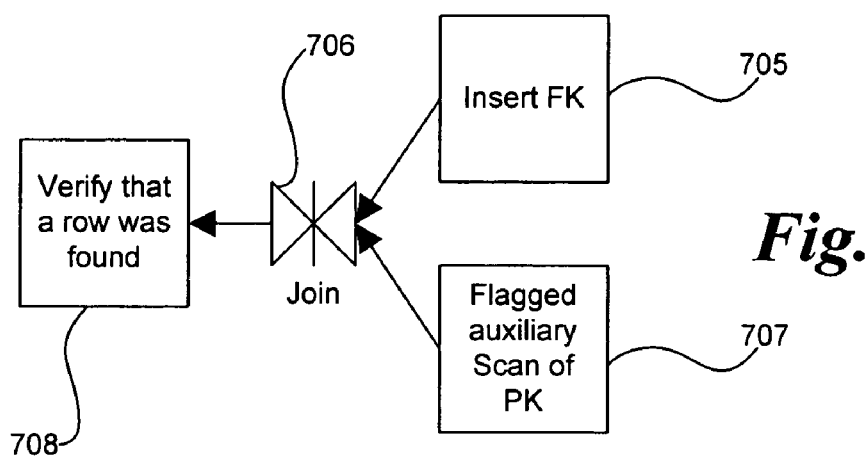
FIG. 6b is a diagram illustrating an implementation of query plan for an exemplary anomalous transaction from Timeline #3 of the specification.
Figure 6C:
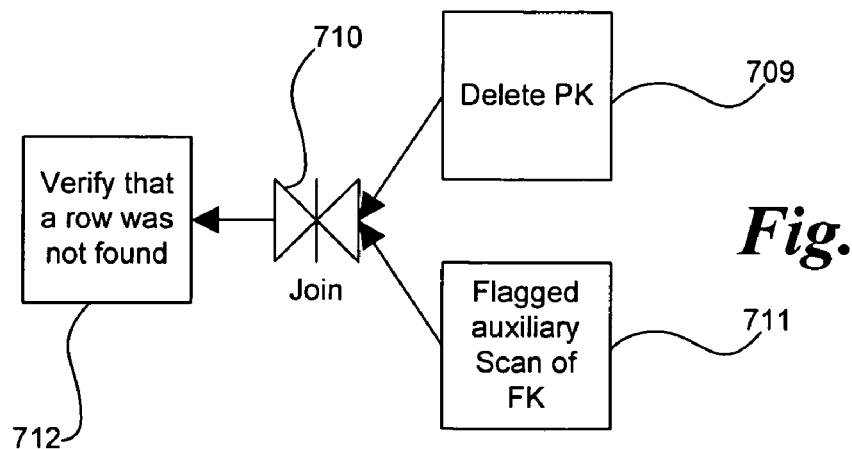
FIG. 6c is a diagram illustrating an implementation of query plan for an exemplary anomalous transaction from Timeline #4 of the specification.

Referring next to FIGS. 6*a* through 6*c*, shown are diagrams illustrating implementations of query plans for various exemplary anomalous transactions. By way of example, FIG. 6*a* shows the "insert row into T2" action performed at step 5 in Timeline #2 from the above background section, firing an implicit insert over the indexed view V. In this example, indexed view V joins tables T1 and T2. Changes either to T1 or T2 must be propagated to the view, if applicable, to guarantee data integrity. Normally the query plan to insert a row into table T2 would only contain the operator to perform this insertion (the "Insert T2" box 701 shown in FIG. 6*a*). However, in presence of indexed views to maintain, more operators must be added to maintain the view. In presence of views that join two tables, the rows that have been either inserted, updated or deleted in the primary target of the DML statement (T2 in this case) are joined 702 with the other table or tables in the view (shown as the flagged auxiliary scan of T1 703, in this case). The result of the join returns the set of rows that must be inserted, updated, or deleted 704 in the view. Recall that the following select performed at step 6 will return the row from the indexed view, since it has been inserted by the current transaction. However, if the join query at step 7 will use a snapshot of T2 taken at the beginning of the transaction, when the table was still empty, then no row will be returned. This would cause the queries at steps 6 and 7 to return different results. This anomaly will be avoided according to the process of FIGS. 2 through 4 because the actual insert into V 704 would only be committed if the snapshot isolation view of the set of rows returned from the auxiliary table scan do not differ from that view of the rows under the read committed isolation level.

Referring now specifically to FIG. 6*b*, illustrated is the is the insert over FK at step 5 of Timeline #3 in the above background section, validating that the foreign key exists in the referenced table PK. Recall here that the query plan for the insert performed at step 5 will contain a scan of the PK table to verify that the values being inserted in FK references an existing row. The row that is to be inserted into FK 705 is joined 706 with those returned from the flagged auxiliary scan of PK 707. The resulting set of rows is used in performing the constraint validation of verifying that a row exists in the referenced table PK 708 having the foreign key of the row to be inserted into FK. If the scan of the PK table was performed under the read committed isolation level, then the insert would succeed. The following join performed at step 6, however, would return no rows, since PK would be read under the current snapshot, and appear empty. However, according to the process of FIGS. 2 through 4, this anomaly would be avoided because the actual constraint validation 708 would only be completed if the snapshot isolation view of the set of rows returned from the scan of the PK table do not differ from that view of the rows under the read committed isolation level.

Referring now specifically to FIG. 6*c*, shown is the delete from table PK at step 5 of the Timeline #4 in the above background section, validating that no matching foreign key exists in the referencing table FK. Recall here that the query plan at step 5 contains a scan of FK to verify that no row exists in the foreign table (FK) matching the one being deleted. The row that is to be deleted from PK 709 is joined 710 with those returned from the flagged auxiliary scan of FK 711. The resulting set of rows is used in performing the constraint validation of verifying that a row was not found 712 in the referenced table FK matching the primary key of the row being deleted from PK. If the scan of FK was performed under the current snapshot, the newly inserted row in FK would be missed, the delete would succeed, and data would be corrupted. However, according to the process of FIGS. 2 through 4, the actual constraint validation 712 would only be completed if the snapshot isolation view of the set of rows returned from the flagged auxiliary scan of FK do not differ from that view of the rows under the read committed isolation level, thus avoiding the anomaly.

Figure 7:
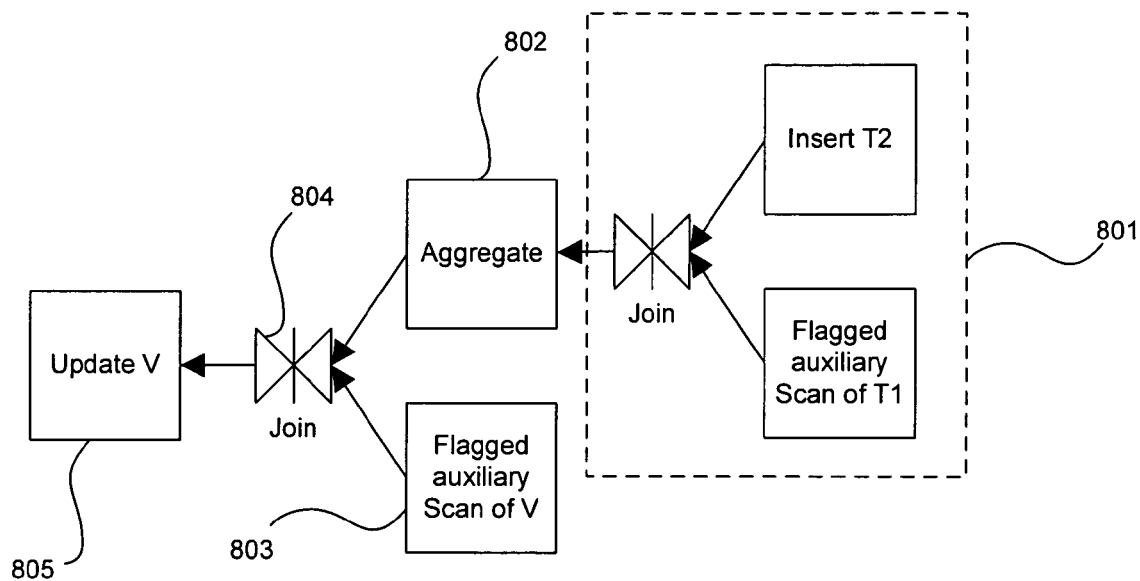
FIG. 7 is a diagram illustrating implementation of a query plan for an exemplary anomalous transaction in which an indexed view contains aggregations.

Referring next to FIG. 7, shown is a diagram illustrating implementation of a query plan for an exemplary anomalous transaction in which an indexed view contains aggregations. FIG. 7 refers to the "insert row into T2" action performed at step 5 in Timeline #2 from the above background section. Recall in this example, indexed view V joins tables T1 and T2.

Changes either to T1 or T2 must be propagated to the view, if applicable, to guarantee data integrity. In presence of aggregations in the indexed view V, joining T1 with T2 and running the aggregation on the result delivers the difference for the aggregate functions. For example, if a row is inserted into T2, and this row matches with 3 rows in T1, the join of these 801 will return 3 rows, and the result of the COUNT aggregation 802 will be 3. This means 3 must be added to the current count stored in the view. In order to do that, the view V is scanned 803 to determine the current count of the view V. It is then joined 804 with the previous aggregate 802, thereby adding 3 to it. Finally, view V is updated 805 with the new value. In this case, the anomaly of the queries at steps 6 and 7 returning different results could still exist. However, this anomaly would be avoided in the same way according to the process of FIGS. 2 through 4 because the actual update of V 805 would only be committed if the snapshot isolation view of the set of rows that are included in the aggregate do not differ from that view of the rows under the read committed isolation level.

Figure 8A:
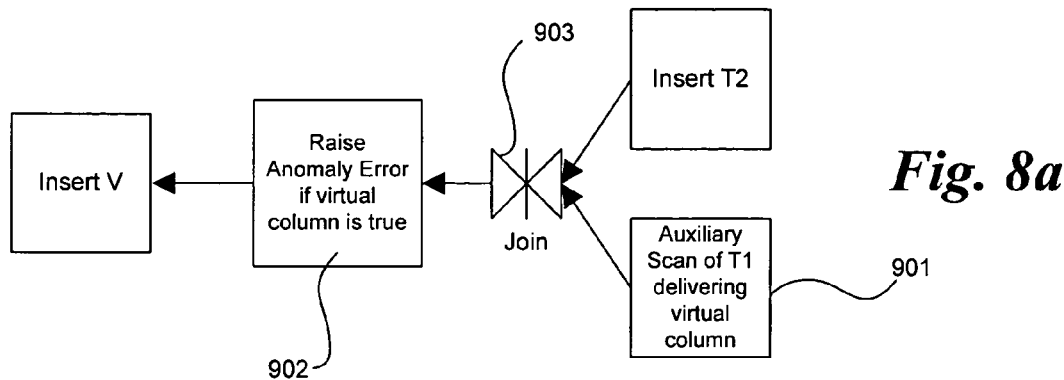
Figure 8B:
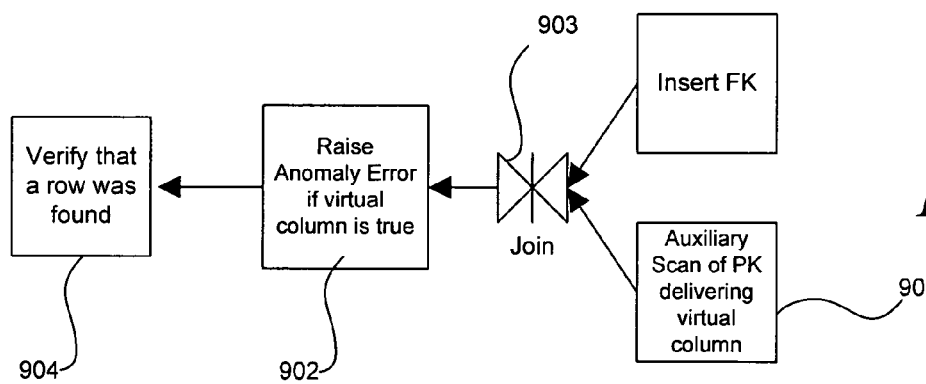
Figure 8C:
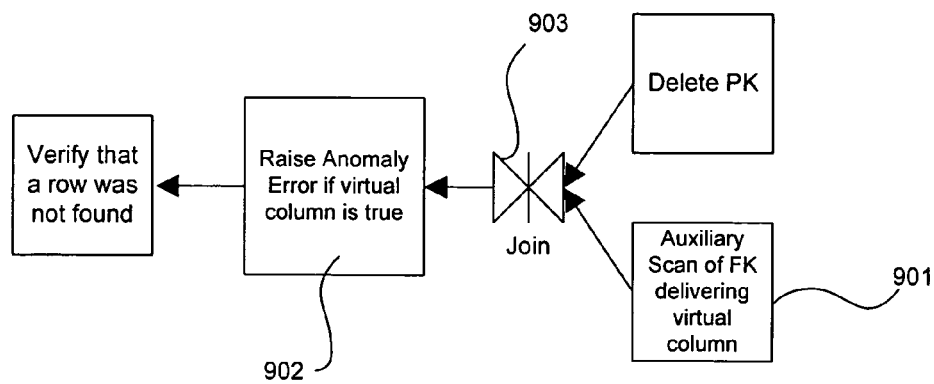
Figure 9A:
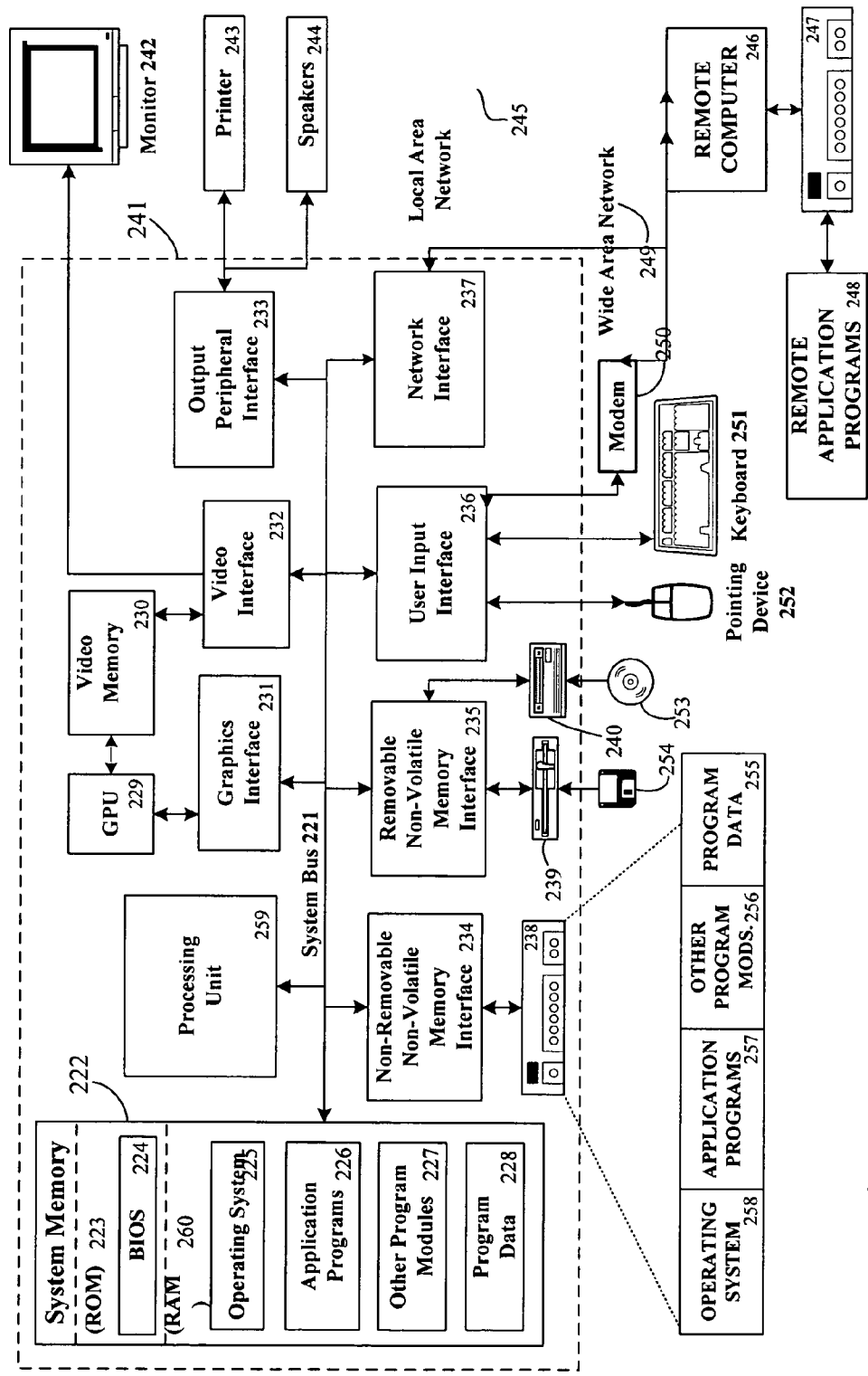
FIG. 9a is a block diagram representing an exemplary computing device suitable for use in conjunction with various aspects of the invention.
Figure 9B:
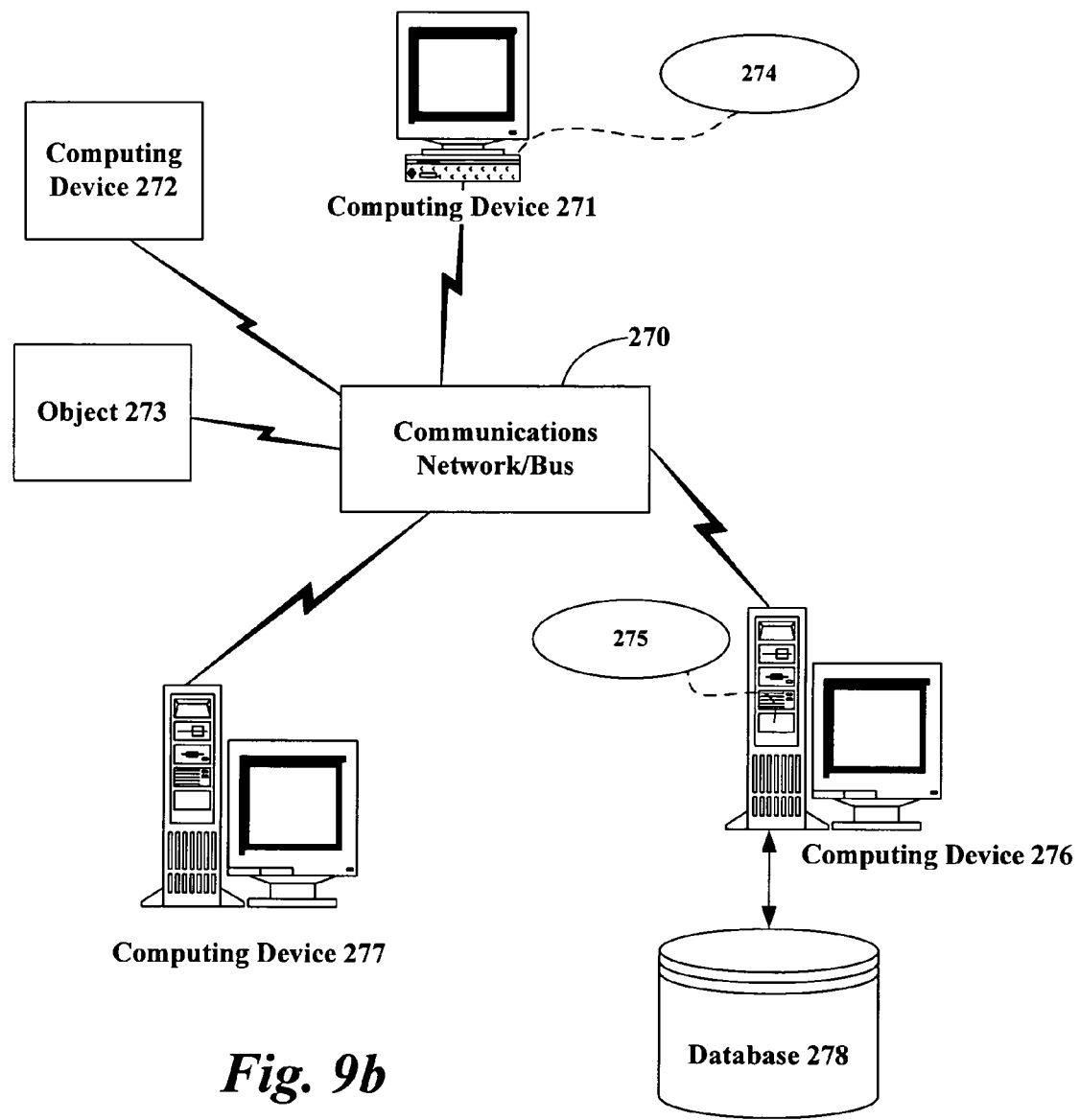
FIG. 9b illustrates an exemplary networked computing environment in which many computerized processes may be implemented.

Referring next to FIGS. 8*a* through 8*c*, shown are diagrams illustrating implementations of query plans for the various exemplary anomalous transactions of FIGS. 6*a* through 6*c*, respectively, following the alternative process of FIG. 5*a*. Notice that in each transaction, a virtual column is added 901 to the result of each of the auxiliary scans performed. This column would indicate, row by row, whether the snapshot isolation view of any of the rows from the scan of the auxiliary tables differed from that view of the row under the read committed isolation level. The virtual column then gets propagated together with the auxiliary table rows in the query plan through any filters and joins 903. Only then are the rows validated 604 before completing any required maintenance of indexed views or verifying any constraint. This prevents generating errors due to false positives because if the row happens to be lost because of a filter or a join, it is guaranteed that it will not cause any anomaly for the current plan.

For example, the scenario indicated in FIG. 8*b* corresponds to the insert over FK at step 5 of Timeline #3 in the above background section, validating that the foreign key exists in the referenced table PK. Recall here that the query plan for the insert performed at step 5 will contain a scan of the PK table to verify that the values being inserted in FK references an existing row. The flagged auxiliary scan of PK would differ from the snapshot view due to the insert of a row at step 3 into PK from another user that was not captured in the snapshot. If utilizing the process of FIGS. 2 through 4, this difference would immediately cause an error to be raised and the transaction aborted. However, if the row being inserted into PK did not have a primary key corresponding to the row being inserted into FK, this error would have been needless because it does not interact with the row being inserted into FK. Of course, in order for the operation to succeed, a valid key must exist in the primary table.

Alternatively, the process of FIG. 5*a* as shown implemented in FIG. 8*b* utilizes the virtual column as described above and then waits to perform the validation 902 until after the join 903 such that the row inserted into PK (having a true value in the virtual column) gets filtered out. As a result, there is no true value in the virtual column to cause an error being generated and the referential integrity constraint can then be verified 904.

Exemplary Computing and Network Environment

Referring to FIG. 9*a*, shown is a block diagram representing an exemplary computing device suitable for use in conjunction with various aspects of the invention. For example, the computer executable instructions that carry out the processes and methods for avoiding anomalies that occur due to ensuring read consistency with snapshot isolation may reside and/or be executed in such a computing environment as shown in FIG. 9*a*. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 9*a* illustrates operating system 225, application programs 226, other program modules 227, and program data 228.

The computer 241 may also include other removable/non-removable, volatile/nonvolatile computer storage media. By way of example only, FIG. 9*a* illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 9*a*, provide storage of computer readable instructions, data structures, program modules and other data for the computer 241. In FIG. 9*a*, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 9*a*. The logical connections depicted in FIG. 9*a* include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 9*a* illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 9b. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 9b provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 9b, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related.

In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 9b, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 9a and the further diversification that can occur in computing in a network environment such as that of FIG. 9b, the systems and methods provided herein cannot be construed as limited in any way to a particular computing architecture. Instead, the invention should not be limited to any single embodiment, but rather should be construed in breadth and scope in accordance with the appended claims.

What is claimed is:

1. A computer-implemented method for determining whether to abort a database transaction, said transaction occurring in a snapshot isolation level, the method comprising:
   the computer creating a first database state comprising a virtual snapshot of the database upon initiation of the transaction;
   the computer processing the transaction using the first database state and concurrently processing one or more other transactions using the first database state;
   the computer determining whether an auxiliary table scan of the first database state is required to process said transaction;
   when an auxiliary table scan is required as part of a data modification query to ensure that logical data consistency is preserved, the computer reading said auxiliary table in a first snapshot view associated with said snapshot isolation level, said first snapshot view comprising committed data values existing in the first database state;
   the computer comparing at least one of said committed data values to at least one data value in a second snapshot view, said second snapshot view comprising a latest committed version of said auxiliary table;

the computer adding a virtual column to each of one or more data items of the latest committed version of said auxiliary table, the virtual column containing a value indicating whether the data item of the latest committed version of said auxiliary table differs from a corresponding data item of the committed data values;

the computer propagating the virtual column and the second snapshot view through the transaction to an operator responsible for indexed view maintenance or referential integrity constraint validation;

the computer checking the virtual column of each data item of the latest committed version of said auxiliary table to determine if the virtual column value indicates that the data item of the latest committed version of said auxiliary table differs from a corresponding data item of the committed data values; and the computer aborting said transaction if the virtual column value of any data item of the latest committed version of said auxiliary table indicates that the data item of the latest committed version of said auxiliary table differs from a corresponding data item of the committed data values.

2. The method of claim 1 wherein said aborting the transaction comprises foregoing maintaining an indexed view.

3. The method of claim 1 wherein said second snapshot view is generated using an isolation level selected from a group comprising: read committed isolation level, repeatable read isolation level and serializable isolation level, wherein each isolation level in the group is implemented using locking.

4. The method of claim 1 wherein the auxiliary table scan is associated with implicitly performing an update action as a result of executing the transaction.

5. The method of claim 1 wherein the auxiliary table scan is associated with maintaining an indexed view.

6. The method of claim 1 wherein the auxiliary table scan is associated with verifying a referential integrity constraint.

7. A computer readable storage medium having stored thereon a plurality of computer-executable instructions that when processed by a processor enable said processor to detect an inconsistency in a database transaction, said computer-executable instructions causing said processor to perform the steps comprising:

creating a first database state comprising a virtual snapshot of the database upon initiation of the transaction;

processing the transaction using the first database state and concurrently processing one or more other transactions using the first database state;

determining whether an auxiliary table scan of a first database state comprising a snapshot of the database at the time of the transaction is required to process said transaction;

when an auxiliary table scan is required as part of a data modification query to ensure that logical data consistency is preserved, reading said auxiliary table in a first snapshot view associated with said snapshot isolation level, said first snapshot view comprising committed data values existing in the first database state;

comparing at least one of said committed data values to at least one data value in a second snapshot view, said second snapshot view comprising a latest committed version of said auxiliary table;

adding a virtual column to each of one or more data items of the latest committed version of said auxiliary table, the virtual column containing a value indicating whether the data item of the latest committed version of said auxiliary table differs from a corresponding data item of the committed data values;

propagating the virtual column and the second snapshot view through the transaction to an operator responsible for indexed view maintenance or referential integrity constraint validation;

checking the virtual column of each data item of the latest committed version of said auxiliary table to determine if the virtual column value indicates that the data item of the latest committed version of said auxiliary table differs from a corresponding data item of the committed data values; and aborting said transaction if the virtual column value of any data item of the latest committed version of said auxiliary table indicates that the data item of the latest committed version of said auxiliary table differs from a corresponding data item of the committed data values.

8. The computer storage medium of claim 7 wherein the computer-executable instructions are such that neither an indexed view is maintained nor a referential integrity constraint validated when said transaction is aborted.

9. The computer storage medium of claim 7 further comprising computer-executable instructions for generating said second snapshot view using an isolation level.

10. The computer storage medium of claim 9 wherein said second snapshot view isolation level is a read committed isolation level.

* * * * *